UNITED STATES PATENT OFFICE.

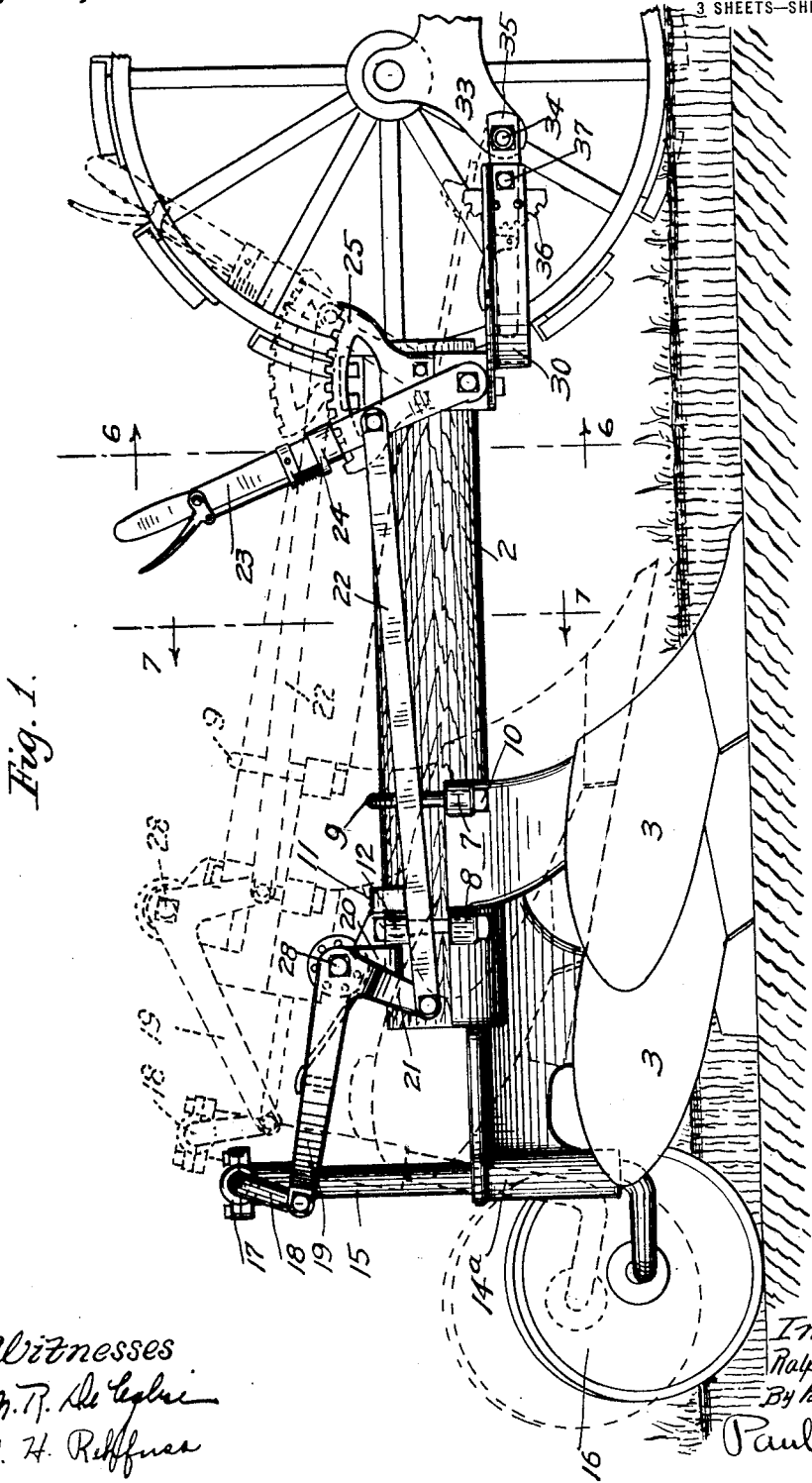

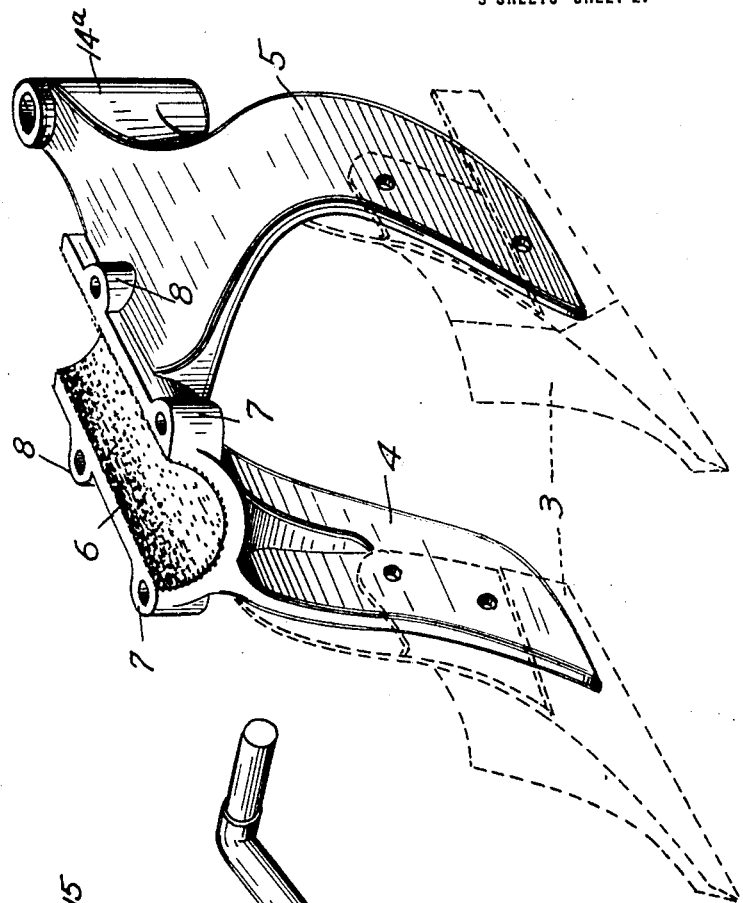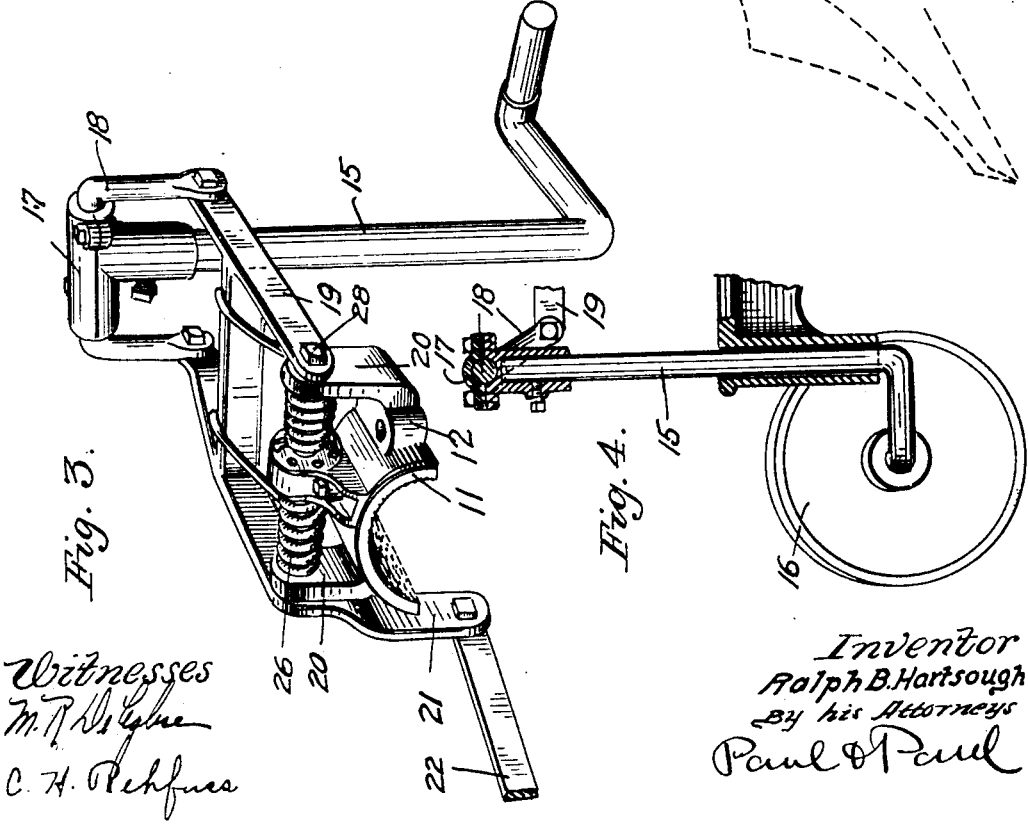

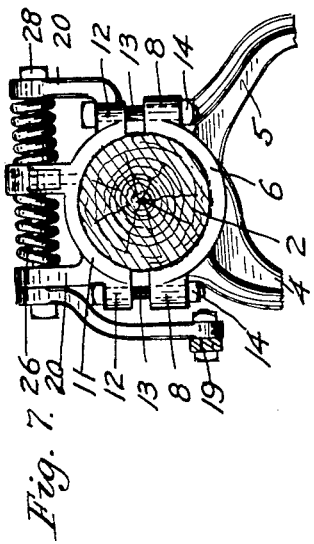
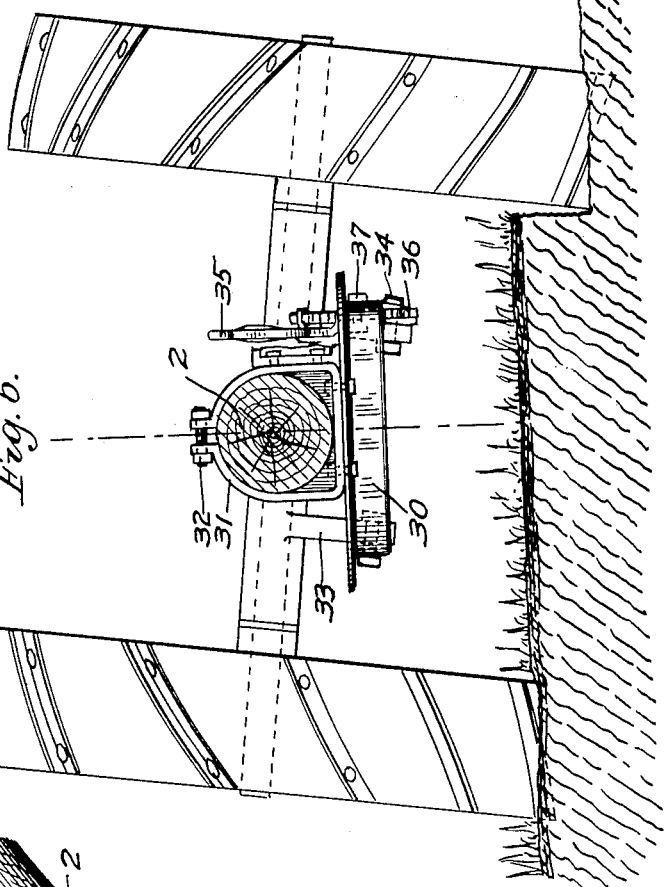
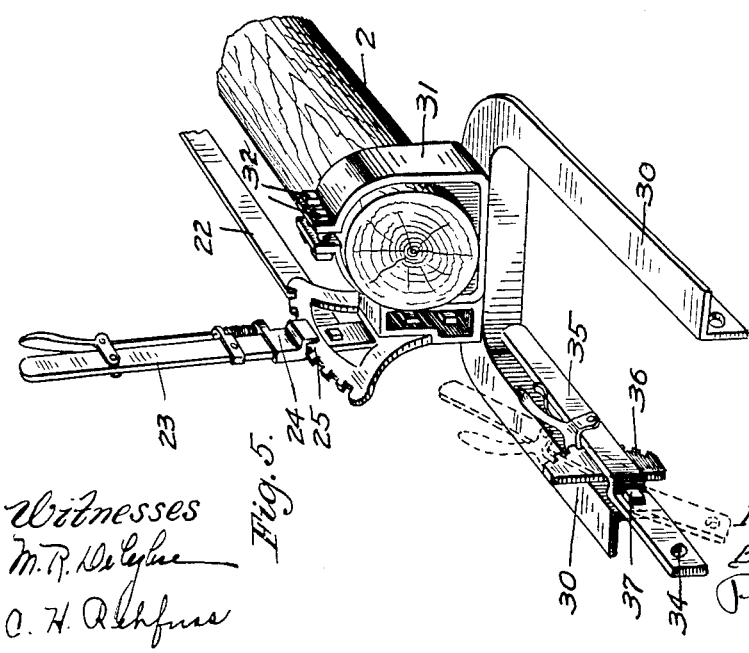

RALPH BEEBE HARTSOUGH, OF MINNEAPOLIS, MINNESOTA, ASSIGNOR TO FLOUR CITY PLOW COMPANY, OF MINNEAPOLIS, MINNESOTA, A CORPORATION OF MINNESOTA.

PLOW.

1,398,075.  Specification of Letters Patent.  Patented Nov. 22, 1921.

Application filed April 4, 1919. Serial No. 287,490.

*To all whom it may concern:*

Be it known that I, RALPH BEEBE HARTSOUGH, citizen of the United States, resident of Minneapolis, in the county of Hennepin and State of Minnesota, have invented certain new and useful Improvements in Plows, of which the following is a specification.

This invention relates to improvements in plows designed especially for use in connection with tractors, and the objects of the invention are to provide a plow having a plurality of bottoms capable of being connected to and drawn by any ordinary tractor and automatically maintaining the proper position for cutting and turning the furrows.

Other objects of the invention are to provide a plow of the general character above indicated that is simple and cheap in construction, that may be readily adjusted, and is capable of use with any ordinary tractor.

The invention consists generally in the constructions and combinations hereinafter described and particularly pointed out in the claims.

In the accompanying drawings forming part of this specification,

Figure 1 is a side elevation of a plow embodying my invention.

Fig. 2 is a perspective view of the saddle or casting to which the plow bottoms are secured.

Fig. 3 is a perspective of the coöperative casting that is arranged on top of the beam.

Fig. 4 is a detail of the supporting caster wheel.

Fig. 5 is a perspective showing the yoke connected to the forward end of the beam.

Fig. 6 is a partial end elevation showing the position of the yoke when one wheel of the tractor is in a furrow.

Fig. 7 is an elevation of the rear end of the beam showing the plow carrying casting clamped thereto.

In the drawings, 2 represents a plow beam preferably of cylindrical form and of any desired length and diameter. I prefer to form this beam of wood and usually employ for this purpose a substantially round log or stick of wood of the desired diameter and length. This provides a beam that is light and of sufficient rigidity, and to which the plow bottom supporting devices, preferably in the form of clamps, may be readily applied. A draft yoke may also be readily applied to the forward end of this beam and all of the parts may be quickly and easily adjusted on the beam, and the adjustment may be changed or altered at any time.

3, 3 represent moldboard plows or plow bottoms of any desired size and form. These are secured in any preferred or usual manner to plow standards 4 and 5, which are in turn formed integrally with or secured to a block 6, having a curved longitudinally extending recess in its upper surface adapted to fit closely upon the under portion of the beam 2. This block is provided with the pairs of lugs 7, 7, 8, 8, arranged at opposite sides thereof. A U-shaped clamp 9 passes around the beam 2 and has threaded ends arranged in the openings in the lugs 7, and is held in position by means of suitable nuts 10 arranged on the ends of said clamp below the lugs 7. A block 11 is preferably arranged upon the beam 2 above the block 6 and is provided with lugs 12 corresponding to the lugs 8 on the block 6. Bolts 13 provided with nuts 14 extend through the opening in the lugs 12 and 8 as shown in Fig. 7 of the drawings. By means of the clamp 9 and the clamping bolts 13 the blocks 6 and 11 may be firmly clamped to the surface of the beam 2. The block 6, and the plows carried thereby, may be located at any desired point on the beam 2, and may be readily adjusted thereon by loosening the nuts and moving the blocks 6 and 11 circumferentially or longitudinally on said beam.

By employing a wooden beam 2 of considerable diameter a large curved bearing surface is provided between the outer circumference of the beam and the curved surface in the block 6 in which said beam is seated, I find it desirable and practicable to form the blocks 6 as an ordinary sand casting and to apply it to the beam 2 without finishing or smoothing up the surface of the curved recess in said block. This surface is, therefore, left somewhat rough having the characteristics of any ordinary casting made in sand molds, and the roughened surface forms the seat for the curved surface of the wooden beam 2. This arrangement and manner of construction not only lessens the cost of manufacture of the plow, by making unnecessary any machine work on the block 6, but the rough surface of the block 6 engaging the curved surface of the beam 2 will form a firm connection between the beam and the block when the clamping bolts are screwed up and immovably hold the block in any position on the beam at which it may be set.

I employ suitable means for vertically adjusting the plow beam and plows carried thereby and also employ suitable means for attaching the plow to a tractor.

As here shown the plow standard 5 has formed integrally with it a bracket 14ª through which extends a vertical post 15, which has a crank axle on its lower end upon which is mounted a gage wheel 16. The post 15 passes through a vertical opening in the bracket 14ª and at its upper end is provided with a bearing 17 in which is mounted a crank axle 18. The ends of this axle are connected to a bifurcated lever 19 pivotally supported on standards 20 on the block 11. This lever has a short arm 21 connected by a rod 22 to an operating lever 23 provided with a latch 24 adapted to engage a toothed rack 25, which is secured to or formed integrally with a suitable support. Counter balance springs 26 are preferably arranged upon the pivot 28 of the bifurcated lever 19, the ends of said springs engaging the block 11 and the lever 19.

For attaching the plow to a tractor I preferably provide a yoke 30 that is provided with a clamp 31 having clamping screws 32 by means of which said yoke can be clamped to the forward end of the beam 2. The yoke 30 is preferably of substantially U-shape, and its ends are secured to suitable hangers or projections 33 on the frame of the tractor. As here shown one leg of the yoke 30 is pivoted to one of the lugs 33 while the other leg is made somewhat shorter and is provided with a pivoted bar 35 with a latch arranged to engage a ratchet plate 36. The bar 35 is pivoted at 37 on the yoke 30, and at 34 to one of the lugs 33. By rocking the lever 35 on its pivot the end of the yoke 30 to which it is connected may be raised or lowered, thereby tilting the yoke 30, and with it the plow-beam and block or saddle casting 6. This action will incline slightly the standards 4 and 5 carrying the plow bottom, rocking the upper ends of said standards toward or from the unplowed land and thereby giving a slight tilt to each of the plows, or, where the tractor frame is at an angle, by reason, for instance, of one wheel traveling in the furrow (see Fig. 6) the yoke will remain level and the plow standards will be vertical while the frame of the tractor is inclined.

Plows that are generally employed at the present time having a plurality of bottoms usually have a light steel frame composed of a series of beams connected together by braces, each beam having a downwardly curved rear end to which one of the plow bottoms is secured. While such plows are ordinarily fairly satisfactory when drawn by animal power they are decidedly unsatisfactory when operated by a tractor, for the reason that the light steel beams and the standards formed by the downwardly curved rear ends of the beams, have considerable spring to them, and the power of the tractor is sufficient to frequently cause such beams to be sprung, and thereby to bring the plows out of parallelism with each other. When this occurs the plow is permanently rendered unsatisfactory and frequently becomes unusable and worthless.

By my invention I entirely remedy these objections to the present day plow. By using a large cylindrical beam I secure the desired rigidity in the beam. While I prefer to employ a cylindrical log or stick of timber for this beam it may be formed of a section of metal tubing or piping, which would give the desired diameter and rigidity without objectionable weight. The metal block 6 may be in the form of a casting which is clamped to the under side of the beam and is provided with standards preferably formed integrally therewith to which the plow bottoms are attached. By using a beam of considerable diameter, formed either of wood or of metal tubing, a heavy casting may be employed presenting a broad surface for clamping against the curved surface of the beam. Heavy cast metal standards for carrying the plows may be provided formed integrally with the block or saddle. These parts will have no tendency to spring, and the block or saddle may be rigidly clamped to the beam and held in position thereon by friction between its broad bearing surface and the corresponding surface of the beam.

By this arrangement I secure the necessary rigidity in the plow bottom supporting parts without any objectionable increase in weight. This I consider to be a very material feature of my invention. The beam, the block and the standards all possess the necessary strength and rigidity and there is no possibility whatever of the plows getting out of parallelism. The parts will not spring under any circumstance. If too much strain is brought upon the plows, one or more of the standards 4 or 5 might break. This would then make it necessary to replace the cast metal block or saddle 6 and the standards 4 and 5 formed integrally therewith. The farmer can order such a casting and quickly replace a broken one, making use of the clamping bolts by which the block or saddle is clamped to the beam.

The details of the construction may be varied in many particulars without departing from my invention.

I claim as my invention:

1. The combination with a cylindrical plow beam, of a saddle block having a recess in its upper surface fitting against the surface of said beam, means clamping said block against the surface of the beam, said clamping means admitting of adjustment for progressive increase of clamping tension of the block against the beam, standards projecting downwardly from said block, and plows carried by said standards, said block constituting a rigid neck connecting one standard to the other and securing both to the beam.

2. The combination, with a cylindrical plow beam, of a saddle block having a broad bearing recess in its upper surface fitting against the under surface of said beam, clamps adjustably securing said block against the lower surface of the beam, standards formed integrally with said block and projecting downwardly therefrom, said block constituting a rigid neck connecting one standard to the other and securing both to the beam, and plows carried by said standard.

3. The combination, with a cylindrical wooden plow beam, of a metal saddle block having a curved recess in the upper surface, clamps extending around said beam and securing said block against the under surface thereof, said clamps admitting of adjustment for progressive increase of clamping tension of the block against the beam, standards depending from said block, and plows mounted on said standards.

4. The combination, with a cylindrical plow beam formed of fibrous material, of a metal saddle block having a curved recess, with a rough or unfinished surface fitting against said beam, means for clamping said block against said beam, depending standards on said block, and plows carried by said standards.

5. The combination, with a cylindrical wooden plow beam, of a metal saddle block having a curved recess fitting the surface of said plow beam, clamps extending around said beam, and securing said block against the surface thereof, standards depending from said block, and rigidly connected one with the other by said saddle, and plows mounted on said standards.

6. The combination with a cylindrical plow-beam, of a saddle block having a recess in its upper surface fitting against the under surface of the beam, means clamping said block against the surface of the beam, standards projecting downwardly from said block, and plows carried by the standards, said block constituting a rigid neck connecting one standard to the other and securing both to the beam.

7. The combination with a cylindrical plow beam, of a metal saddle block having a curved recess in the upper surface in which the beam is seated, the beam being of relatively softer material than the saddle block and to a degree compressible, clamps extending around said beam and securing the block against the under surface thereof, the beam being placed under compression by said clamps and saddle block, standards depending from said block, and plows mounted on said standards.

8. The combination with a cylindrical plow-beam of relatively large diameter and formed of fibrous material, of a metal saddle-block having a curved recess, with a rough or unfinished surface fitting against said beam, the roughened surface of the saddle increasing frictional engagement with the beam and tending to embed therein, means for clamping said block against said beam, depending standards on said block, said standards being rigidly connected one to the other and secured to the beam by the saddle, and plows carried by said standards.

9. The combination with a plow beam, of a metal saddle-block formed with a recess to receive the underside of the beam and having apertured ears on each side, standards connected one to the other by the saddle block, a second block recessed to receive the upper side of the beam and formed with apertured ears on opposite sides, a clamp passed around the beam and fastened to one set of the apertured ears, bolts passed through the other ears of the lower saddle and the ears of the upper saddle, a sleeve supported by the lower saddle, a wheel spindle in said sleeve, and means supported from the upper saddle and connected with said spindle for lifting the end of the beam and plow standards.

10. The combination with a plow beam, of a metal saddle block recessed to receive the underside of the beam, a second saddle block recessed to receive the upper side of the beam, means clamping both blocks to the beam, a wheel spindle passing through a sleeve supported from the lower saddle block, a frame pivotally supported from the upper saddle block and connected with the wheel spindle, a tension spring associated with said frame, and means connected with said frame for lifting the end of the beam and attached parts.

In witness whereof, I have hereunto set my hand this 12 day of March 1919.

RALPH BEEBE HARTSOUGH.

Witnesses:
FRANK J. MORLEY,
MAURICE A. HERSIAN.